United States Patent
Kim et al.

(10) Patent No.: US 7,548,582 B2
(45) Date of Patent: Jun. 16, 2009

(54) KALMAN-VITERBI JOINT CHANNEL EQUALIZER

(75) Inventors: Sung-Hoon Kim, Daejeon (KR);
Yong-Hun Sim, Seoul (KR);
Seung-Won Kim, Daejeon (KR);
Chieteuk Ahn, Daejeon (KR); Dae-Jin Kim, Gwangju (KR)

(73) Assignee: Electronics and Telecommunications Research Institute (KR)

( * ) Notice: Subject to any disclaimer, the term of this patent is extended or adjusted under 35 U.S.C. 154(b) by 680 days.

(21) Appl. No.: 10/511,916

(22) PCT Filed: Apr. 17, 2003

(86) PCT No.: PCT/KR03/00779

§ 371 (c)(1),
(2), (4) Date: Jul. 8, 2005

(87) PCT Pub. No.: WO03/090461

PCT Pub. Date: Oct. 30, 2003

(65) Prior Publication Data

US 2005/0286622 A1     Dec. 29, 2005

(30) Foreign Application Priority Data

Apr. 17, 2002  (KR) ................. 10-2002-0020845

(51) Int. Cl.
*H03H 7/30* (2006.01)
*H03H 7/40* (2006.01)
*H03K 5/159* (2006.01)
*G06F 17/10* (2006.01)

(52) U.S. Cl. .............. 375/232; 375/229; 375/233; 708/323

(58) Field of Classification Search ............. 375/232, 375/229
See application file for complete search history.

(56) References Cited

U.S. PATENT DOCUMENTS 5,274,670 A * 12/1993 Serizawa et al. ............ 375/231

(Continued)

FOREIGN PATENT DOCUMENTS

| JP | 2001/251226 | 9/2001 |
| KR | 1999-0038973 | 6/1999 |

OTHER PUBLICATIONS

A robust adaptive DFE receiver for DS-CDMA systems under multipath fading channels Li-Mei Chen; Bor-Sen Chen; Signal Processing, IEEE Transactions on [see also Acoustics, Speech, and Signal Processing, IEEE Transactions on] vol. 49, Issue 7, Jul. 2001 pp. 1523-1532.*

*Primary Examiner*—Mohammad H Ghayour
*Assistant Examiner*—Sarah Hassan
(74) *Attorney, Agent, or Firm*—Blakely, Sokoloff, Taylor & Zafman

(57) ABSTRACT

In a channel equalizer applicable to a digital television receiver, a forward filter and a backward filter perform filtering to an input signal and a predetermined signal. A Viterbi decoder corrects errors during a transmission procedure in a blind mode. A training symbol storing block stores training symbols. An output signal of the Viterbi decoder and symbols are provided to the backward filter in accordance with a blind mode or a training mode. A Kalman gain is calculated in a Kalman gain calculating block and an error signal is calculated by comparing an equalized signal, symbols, and the output signal of the Viterbi decoder with one another. A tap coefficient is updated by using the calculated error signal and the Kalman gain.

7 Claims, 3 Drawing Sheets

U.S. PATENT DOCUMENTS

| | | | |
|---|---|---|---|
| 5,673,294 A * | 9/1997 | Namekata | 375/341 |
| 5,706,057 A * | 1/1998 | Strolle et al. | 375/240.01 |
| 5,822,380 A * | 10/1998 | Bottomley | 375/347 |
| 5,930,296 A * | 7/1999 | Kot | 375/233 |
| 6,002,713 A * | 12/1999 | Goldstein et al. | 375/222 |
| 6,426,780 B1 * | 7/2002 | Limberg et al. | 348/725 |
| 6,563,889 B1 * | 5/2003 | Shih et al. | 375/341 |
| 2003/0081669 A1 * | 5/2003 | Yousef et al. | 375/233 |
| 2003/0152170 A1 * | 8/2003 | Yousef | 375/340 |
| 2004/0042545 A1 * | 3/2004 | Han et al. | 375/232 |

* cited by examiner

Input data and output value when the following input data are given

| input data $Y_1$ | 1 | 1 | 0 | 1 | 1 | 0 | 1 | 0 | 1 |
|---|---|---|---|---|---|---|---|---|---|
| input data $Y_2$ | 1 | 1 | 0 | 0 | 1 | 1 | 0 | 0 | 0 |
| transmit data | 110 | 111 | 001 | 011 | 110 | 100 | 010 | 001 | 010 |
| transmit value | 5 | 7 | -5 | -1 | 5 | 1 | -3 | -5 | -3 |
| received value | 5 | 6.5 | -5 | -1.5 | 5 | 1 | -3 | -5 | -3 |

Trellis diagram that actually transmitted data should have(thick solid line)

KALMAN-VITERBI JOINT CHANNEL EQUALIZER

BACKGROUND OF THE INVENTION

The present patent application is a non-provisional application of International Application No. PCT/KR03/00779, filed Apr. 17, 2003.

(a) Field of the Invention

The present invention relates to an equalizer and a control method of the equalizer which are used for improving performance in a receiver under a multi-path communication environment of indoor, portable, and mobile reception.

(b) Description of the Related Art

In the ATSC (Advanced Television Systems Committee) standard which has been adopted as a digital television broadcasting standard in North America, there is a problem in that transmission signals are distorted under an indoor and mobile communication environment due to variable channel and multi-path effects. This reduces reception performance in a receiver such as a digital television.

In a digital communication system, data transmission is performed in symbol units through a restricted frequency band width, and pulse energy of a symbol may be dispersed into neighboring symbol pulses due to a time dispersion effect. This induces interference in the neighboring symbols. In addition, transmitted data is affected by various kinds of channel distortions, caused by such effects as a multi-path effect, a frequency offset effect, a phase jitter effect, and so on. These effects induce ISI (Inter-Symbol Interference) which may affect neighboring symbols of a transmission symbol in a digital communication system. Therefore, the ISI becomes a barrier to obtaining desired data in a receiver. In addition, most communication channels require an adaptive equalizer which may update tap coefficients adaptively with respect to time variation, since the above described distortions are variable.

FIG. 1 illustrates a block diagram of a conventional VSB (vestigial sideband) signal receiving system. In FIG. 1, a tuner 100 receives an RF signal from an antenna and synchronizes the RF signal with a local oscillation signal to transform the RF signal into an IF signal; an NTSC removing filter 200 removes an NTSC component from the IF signal to prevent degradation of an HDTV due to the NTSC component; an equalizer 300 removes multi-path distortion generated in a transmission channel by equalizing an input signal; a phase tracer 400 removes phase noise from the equalized signal; a trellis decoder 500 performs trellis decoding with respect to an output signal of the phase tracer 400, and outputs the decoded signal; a data de-interleaver 600 performs reverse interleaving to the input signal; an RS decoder 700 performs Reed-Solomon decoding to the input signal so as to generate error-corrected bit streams; and a de-randomizer 800 provides the decoded signal into other elements of the receiving system.

In FIG. 2, a detailed configuration of an ATSC VSB equalizer is illustrated. The equalizer 300 basically uses an LMS algorithm. In FIG. 2, a front filter 301 and a rear filter 302 remove an inter-symbol interference component, which generates distortion, from a received signal. In case of a blind mode, a quantization block 303 compares the signal outputted from the filters 301 and 302 with a predetermined threshold value and outputs hard-decision data. A training symbol storing block 304 stores a training data symbol which is perceived in a transmitting system. The training symbol is fetched into the rear filter 302 and an error signal calculating block 306 in a training mode, and it is used for calculating errors of the equalized signal. In case of a blind mode, the output signal of the quantization block 303 and the equalized signal are used for calculating errors. A switching block 305 passes the equalized signal or training symbol therethrough in accordance with the two modes. The calculated error is outputted to a tap coefficient updating block 307.

The tap coefficient updating block 307 receives an error signal and input signal of the filter 301, and updates the tap coefficient by using an LMS algorithm. Such an updating method is as shown in the following Equation 1.

$$C(n+1) = C(n) + \mu x(n)e(n) \qquad \text{[Equation 1]}$$

In Equation 1, $c(n)$ is a coefficient of a filter, $x(n)$ is a received signal, $e(n)$ is an error signal calculated in the error signal calculating block 306, and $\mu$ is a step size.

As such a channel equalizer, a DFE (decision feedback equalizer) is widely used in a digital television receiver. When a decision error is not generated in a quantization block of the DFE, noise amplification at output of the equalizer, which becomes a problem in a conventional linear equalizer, does not appear when a rear filter removes ISI due to a symbol determined previously. For this reason, the DFE is widely used in a receiving system. Therefore, it is important that a decision error is not generated at output of a quantization block, so the DFE can be used effectively. For attaining this technical point, a method for reducing decision error by inserting a training symbol at a constant period has been used in a digital communication system, while willingly accepting a reduction in data transmission efficiency. However, not enough training symbols are inserted in most cases. The conventional DFE does not have a rapid enough convergent speed to compensate for distortion of a received signal that is generated due to inter-channel interference under a highly distorted communication environment such as indoor reception, mobile reception, or in a communication environment producing ghost images such as a broadcasting channel. Therefore, a better equalizer that has a rapid convergent speed even in a highly distorted communication environment and is efficient at dealing with distortion even in a data duration without the training symbol being inserted is required.

SUMMARY OF THE INVENTION

In order to solve the above described problem, the present invention provides a fast Kalman-Viterbi joint channel equalizer instead of a conventional equalizer using an LMS algorithm.

An equalizer according to one aspect of the present invention comprises:

a forward filter and a backward filter for receiving an input signal and a predetermined signal and performing filtering to the signals;

a Viterbi decoder for correcting errors during a transmission procedure in a blind mode;

a training symbol storing block for storing training symbols;

a switching block for classifying an output signal of the Viterbi decoder and symbols in accordance with a training mode and a blind mode, and inputting the output signal of the Viterbi decoder and symbols into the backward filter;

a Kalman gain calculating block for receiving input signals of the forward filter and the backward filter and calculating a Kalman gain;

an error signal calculating block for calculating an error signal by comparing an equalized signal, symbols, and the output signal of the Viterbi decoder with one another; and a tap coefficient updating block for updating a tap coefficient of the filters by using the calculated error signal and the Kalman gain.

The equalizer of the present invention uses a fast Kalman algorithm, which is a kind of a fast adaptive equalizing algorithm, so as to solve a problem of the slow convergent speed of a conventional LMS equalizer. In order to minimize a feedback decision error in a blind period, the equalizer of the present invention performs a soft-decision by using a Viterbi algorithm instead of performing a hard-decision of the output signal in a forward filter or a backward filter. An algorithm on a Kalman equalizer is introduced in an article in IBM journal Re. Dev., vol 18, pp. 267-273, May, 1980, entitled "Channel Equalization Using a Kalman Filter for Fast Data Transmission" by D. N. Godard. A fast Kalman algorithm is introduced in articles in IEEE Trans. Comm., vol. COM-26, pp. 1439-1446, October, entitled "Application of Fast Kalman Estimation to Adaptive Equalization" by D. D. Falconer et al. and in an IEEE Trans. Acoust., Speech, Signal Processing, vol. ASSP-31, pp 1394-1402, entitled "A Fast Sequential Algorithm for Least-Squares Filtering and Prediction" by G. Carayannis et al. A Viterbi algorithm is introduced in an article in IEEE Trans. Inform. Theory, vol. IT-13, pp. 260-269, April, entitled "Error Bounds for Convolutional Codes and an Asymptotically Optimum Decoding Algorithm" by A. J. Viterbi.

The equalizer of the present invention operates in two kinds of modes, a training mode and a blind mode. In the training mode, a transmitting part transmits a training symbol, which is previously perceived by a receiving part, during a predetermined period for channel equalization. The equalizer compares a signal distorted through transmission of a channel with the above perceived training symbol to determine characteristics of the channel. In a blind mode, when a training symbol does not exist after the training mode, the equalizer performs equalization by using only probability distribution of a signal symbol in a transmitting part and a received data signal. Therefore, it is not easy to solve distortion due to interference of inter-symbols in a blind mode compared to a training mode. The equalizer of the present invention is illustrated in FIG. 3. The equalizer has characteristics in that it comprises a forward filter and a backward filter for receiving an input signal and a predetermined signal, and it performs filtering to the signals; a Viterbi decoder for correcting errors during a transmission procedure in a blind mode; a training symbol storing block for storing training symbols; a switching block for classifying an output signal of the Viterbi decoder and symbols in accordance with a training mode and a blind mode and inputting the output signal of the Viterbi decoder and symbols into the backward filter; a Kalman gain calculating block for receiving input signals of the forward filter and the backward filter and calculating a Kalman gain; an error signal calculating block for calculating an error signal by comparing an equalized signal, symbols, and the output signal of the Viterbi decoder with one another; and a tap coefficient updating block for updating a tap coefficient of the filters by using the calculated error signal and the Kalman gain. The present invention also has characteristics in that the equalizer according to the present invention updates a coefficient of filters by using a fast Kalman algorithm while a conventional equalizer updates the coefficient of filters by using an LMS algorithm. Further, the equalizer according to the present invention removes transmission error in a blind mode by using a Viterbi decoder instead of a quantization block.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

Figure 1:
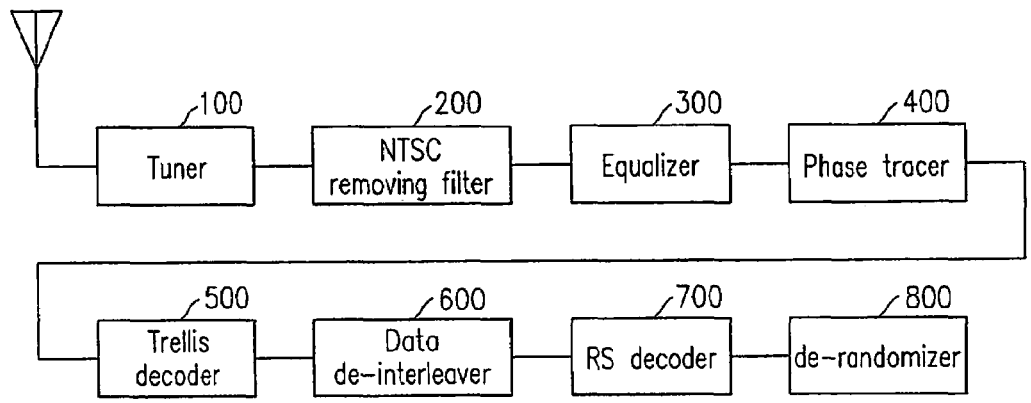
FIG. 1 illustrates a schematic block diagram of a conventional VSB signal receiving system.
Figure 2:
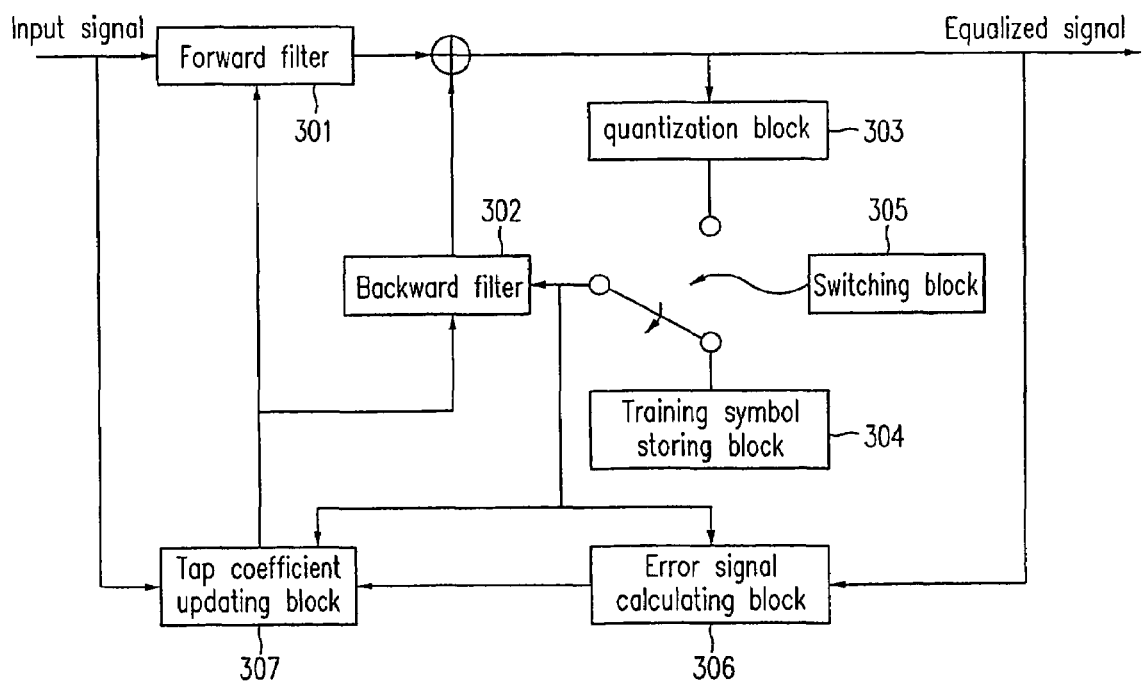
FIG. 2 illustrates a structure of an ATSC standard equalizer.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

At first, a fast Kalman algorithm will be described by referring to Falconer's paper in the following.

Various kinds of signals, filter coefficients, and other variables may be defined as below.

$x_N(n)$: input signal vector for overall filters
$y(n)$: forward filter input signal sample
$d(n)$: desired signal
$x_N(n)=[y(n-1), \ldots y(n-N_1)|d(n) \ldots d(n-N_2)]^T$
$\xi_p(n)=[y(n)d(n)]^T$
$\rho_p(n)=[y(n-N_1)d(n-N_2)]^T$
$\epsilon_p(n)$: forward preceding error
$\epsilon_p(n)'$: forward following error
$A_{Np}(n)$: forward prediction coefficient matrix
$E_{pp}(n)$: forward sum error
$\eta_p(n)$: backward prediction error
$k_N(n)$: Kalman gain
$D_{Np}(n)$: backward prediction coefficient matrix
$C_N(n)$: tap coefficient for overall filters When computation starts, the forward preceding error, forward following error, forward prediction coefficient matrix, and forward sum error are evaluated by using the following Equation 2.

$$\epsilon_p(n)=\xi_p(n)+A_{Np}(n-1)^T x_N(n)$$

$$A_{Np}(n)=A_{Np}(n-1)-k_N(n)\epsilon_p(n)^T$$

$$\epsilon_p(n)'=\xi_p(n)+A_{Np}(n)^T x_N(n)$$

$$E_{pp}(n)=\lambda E_{pp}(n-1)+\epsilon_p(n)'\epsilon_p(n)^T \qquad \text{[Equation 2]}$$

When we obtain the forward preceding error, forward following error, forward prediction coefficient matrix, and forward sum error, the Kalman gain may be evaluated through the following Equation 3 by using the above results.

$$\bar{k}_M(n) = S_{MM}\left[\frac{E_{pp}(n)^{-1}\varepsilon_p(n)'}{k_N(n) + A_{Np}(n)E_{pp}(n)^{-1}\varepsilon_p(n)'}\right] \quad \text{[Equation 3]}$$

$$Q_{MM}\bar{k}_M(n) = \left(\frac{m_N(n)}{\mu_p(n)}\right)$$

$$\eta_p(n) = \rho_p(n) + D_{Np}(n-1)^T x_N(n+1)$$

$$D_{Np}(n) =$$
$$[D_{Np}(n-1) - m_N(n)\eta_p(n)^T][I_{pp} - \mu_p(n)\eta_p(n)^T]^{-1}$$

$$k_N(n+1) = m_N(n) - D_{Np}(n)\mu_p(n)$$

The $S_{MM}$ and $Q_{MM}$ in equation 3 have operations as below.

When $x_N(n) = \begin{bmatrix} y(n-1) \\ y(n-2) \\ \vdots \\ y(n-N_1) \\ d(n-1) \\ d(n-2) \\ \vdots \\ d(n-N_2) \end{bmatrix}$ and $\bar{x}_M(n) = \begin{bmatrix} y(n) \\ y(n-1) \\ \vdots \\ y(n-N_1) \\ d(n) \\ d(n-1) \\ \vdots \\ d(n-N_2) \end{bmatrix}$ are given above, the following relationship may come into existence.

$$S_{MM}\bar{x}_M(n) = \left[\frac{\xi_p(n)}{x_N(n)}\right], Q_{MM}\bar{x}_M(n) = \left[\frac{x_N(n+1)}{\rho_p(n)}\right]$$

A Viterbi decoder is a kind of a maximum likelihood decoder that is used for decoding bit streams having coded information in a communication system. When an actually transmitted value provided from the exterior of the decoder is estimated on the basis of a state metric which is an observation value passing through a communication channel, the Viterbi decode determines a maximum likelihood state metric value, which makes a relevant probability maximum with respect to an actually transmitted value and an observation value, as an estimation value with respect to the actually transmitted value. The Viterbi decoder stores a life path into a path memory, and then decodes a symbol by tracing back the path memory on the basis of the state metric. When symbols to be decoded are sequentially inputted into the decoder and at the same time all of the life paths are inputted in the initial stage, the Viterbi decoder traces back the path memory in units of one time tracing, and decodes the following symbol.

The present invention has been conceived to improve the convergent speed and reduce residual error by combining a fast Kalman algorithm into the Viterbi decoder. As one embodiment of such an application, the present invention provides a method for improving equalization performance in an 8-VSB system, which is a North American type ground wave digital television standard.

Figure 3:
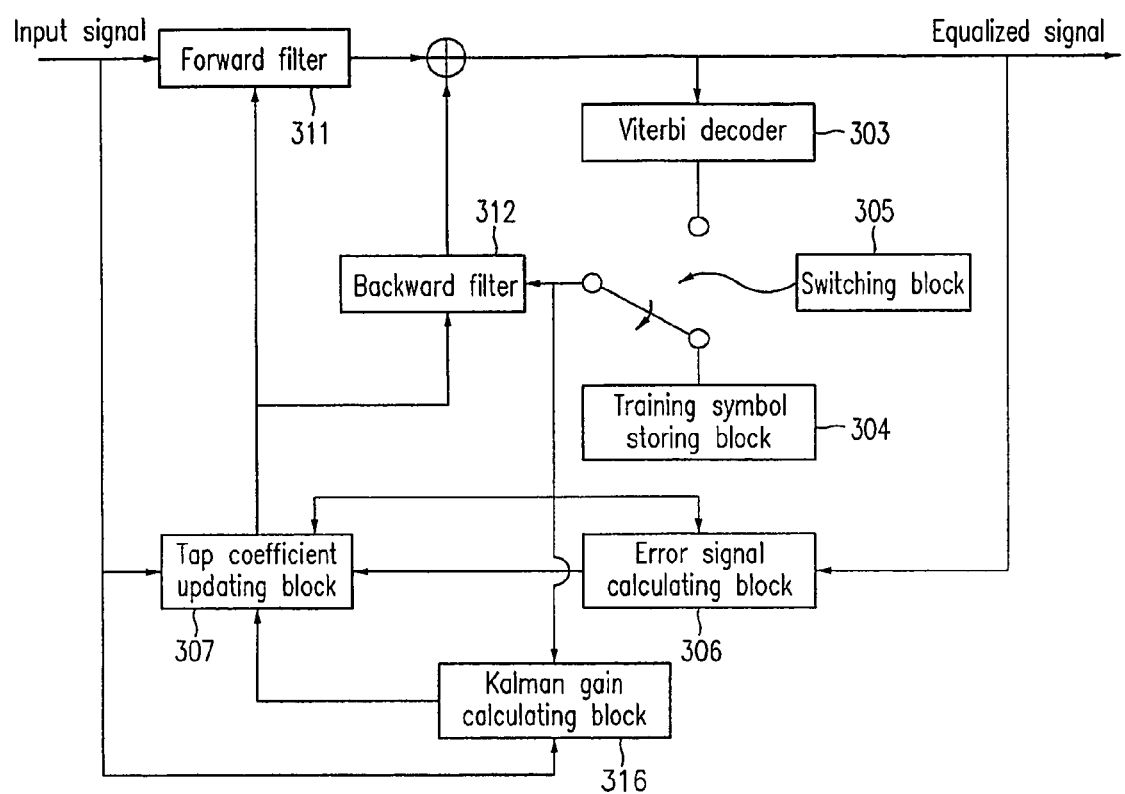
FIG. 3 illustrates a block diagram of a Kalman-Viterbi joint channel equalizer according to an embodiment of the present invention.

A Kalman-Viterbi joint channel equalizer according to the present invention is illustrated in FIG. 3.

As shown in FIG. 3, the Kalman-Viterbi joint channel equalizer comprises a forward filter 311, a backward filter 312, a Viterbi decoder 313, a training symbol storing block 314, a switching block 315, a Kalman gain calculating block 316, an error signal calculating block 317, and a tap coefficient updating block 318.

Output signals of the filters 311 and 312 may be represented as in the following Equation 4.

$$y[n] = \sum_{i=0}^{N_b-1} b_i[n]x[n-i] + \sum_{j=1}^{N_a} a_j[n]\hat{d}[n-j] \quad \text{[Equation 4]}$$

In the above Equation 4, x[n] is an input signal of the filters 311 and 312 at time n, y[n] is an output signal of the filters 311 and 312 at time n, $b_i[n]$ is a tap coefficient of the forward filter 311 at time n, $a_j[n]$ is a tap coefficient of the backward filter 312 at time n, $N_b$ is a tap number of the forward filter 311, $N_a$ is a tap number of the backward filter 312, and $\hat{d}[n]$ is a training symbol in case of a training mode while being an output signal of the Viterbi decoder in case of a blind mode.

As can be seen from the above Equation 4, the forward filter 311 sequentially delays digital input data x[n] sampled at a bit rate of 10.76 MHz, multiplies the digital input data x[n] by $b_i[n]$ sequentially, and adds each result of the multiplication to output equalized data. Then, the backward filter 312 has the same operation as the forward filter 311, excepting that input of the backward filter 312 is a training symbol or an output signal of the Viterbi decoder. While performing these operations periodically, the filters 311 and 312 adjust tap coefficients to optimal values on the basis of the information inputted from the tap coefficient updating block 318, and perform filtering to the input signal, thereby obtaining desired output data. At this time, the forward filter 311 performs filtering to symbols inputted from the exterior of the decoder, and removes interference between the exterior signals. The backward filter 312 performs filtering by using a previously detected value so as to remove an interference signal of the present symbol, which is induced by the previously detected symbol.

The switching block 315 determines a training mode or a blind mode. In case of the training mode, the switching block 315 outputs training symbols from the training symbol storing block 314. In case of the blind mode, the switching block 315 uses the output of the Viterbi decoder 313 instead of a simple quantizer used as a symbol detector in a conventional equalizer. The Viterbi decoder 313 starts to operate in the blind mode right after the training mode. The Viterbi decoder 313 receives output of the filters 311 and 312, and corrects a decision error of a transmission signal by performing a soft-decision. Therefore, the convergent speed in the blind mode may be improved. At this time, the Viterbi decoder 313 performs decoding by using a method for selecting a minimum distance among Euclidian distances.

Figure 4:
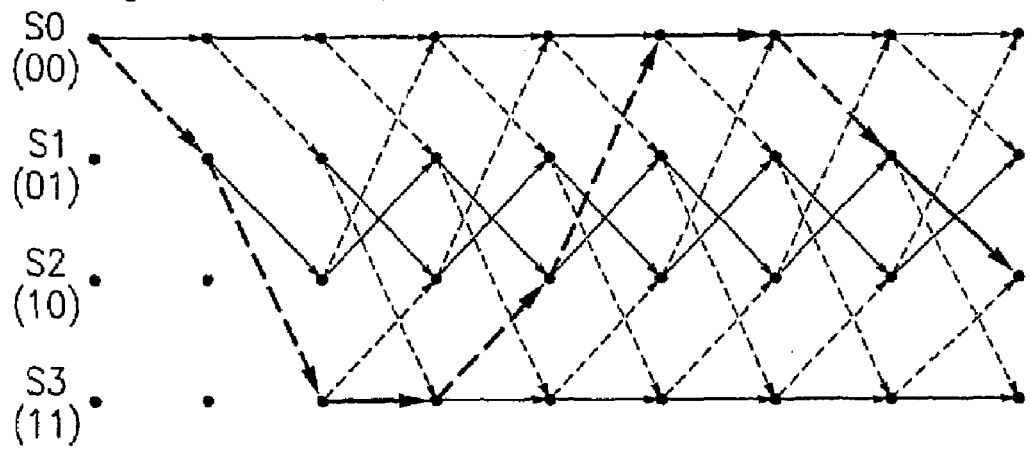
FIG. 4 illustrates a procedure for calculating Euclidian distance of a Viterbi decoding algorithm and searching a life path.

FIG. 4 illustrates an example of the Viterbi decoding algorithm. As shown in Equation 3, the computation amount increases in a fast Kalman algorithm when the number of additionally inputted data and outputted data increase. Therefore, it is required that the tracing back length is minimized in the Viterbi decoder in order to reduce the computation amount. When a fast Kalman algorithm is applied to a DFE, the multiplication computation amount may be represented as in the following Equation 5.

Computation Amount: $7Np+Np^2+3p^2+2N+(4/3)p^3-p/3$ $p=2*(1+\text{trace\_back\_len}*12)$ [Equation 5]

N: number of equalizer taps
p: number of additional data inputted from a fast Kalman algorithm
trace_back_len: tracing back length at Viterbi decoder Accordingly, the shorter the tracing back length becomes, the less the multiplication computation amount of the algorithm used in the blind mode becomes. It is possible to obtain a more accurate value by increasing the tracing back length. When the computation amount decreases or the decoding delay value is long as in a digital broadcasting system using twelve TCM coders, the tracing back length is set to "1" to decrease the delay value, and hence the multiplication computation amount of the equalizer used in the blind mode may decrease. Through application of the above method, hardware complexity may be reduced by 1/state as compared with a PSP (per-survivor processing) algorithm which is a conventional equalizing method. In addition, a problem that the PSP algorithm does not remove pre-echo may be solved.

The error signal calculating block 317 receives an equalized signal and training symbol or output of the Viterbi decoder, and then calculates an error signal through the following Equation 6.

$$e(n+1) = d(n+1) - C_N(n)^T x_N(n+1) \quad \text{[Equation 6]}$$

The Kalman gain calculating block 316 receives input signals of the forward filter 311 and the backward filter 312, and calculates Kalman gain by using the Equations 2 and 3. Then, the Kalman gain calculating block 316 transmits the calculated Kalman gain into the tap coefficient updating block 318, which performs tap coefficient updating by using the above error signal and the Kalman gain, and transmits the tap coefficient into each of the filters 311 and 312. An equation for updating of tap coefficients is shown in the following Equation 7.

$$C_N(n+1) = C_N(n) + k_N(n+1)e(n+1) \quad \text{[Equation 7]}$$

The tap coefficient updating block 318 transmits a tap coefficient determined by the above Equation 7 into each of the filter 311 and 312.

When channel equalization has been finished at time index n through the above described procedure, the time index n is incremented by "1". The channel equalization is performed by repeating the above procedure.

According to the present invention, the fast Kalman-Viterbi joint channel equalizer may improve reception performance of an N level VSB digital television under a dynamic multi-path environment.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims. For example, all the possible equalizing algorithms such as a traditional Kalman and RLS algorithm, a fast RLS (recursive least squares), or an LMS system may be applied to the equalizer of the present invention. Therefore, it will be obvious for those skilled in the art to change, alter, or adjust the disclosed embodiments without departing from the spirit and scope of the invention. Although the present invention has been described and illustrated in detail, it is clearly understood that the same is for illustration and example only, and is not to be taken as limitation, the spirit and scope of the present invention being limited only by the terms of the appended claims.

What is claimed is:

1. A Kalman-Viterbi joint channel equalizer, comprising:
a forward filter and a backward filter for receiving an input signal and a predetermined signal and performing filtering to the signals;
a Viterbi decoder for correcting errors during a transmission procedure in a blind mode;
a training symbol storing block for storing training symbols;
a switching block for classifying an output signal of the Viterbi decoder and symbols in accordance with a training mode and the blind mode, and inputting the output signal of the Viterbi decoder and symbols into the backward filter;
a Kalman gain calculating block for receiving input signals of the forward filter and the backward filter and calculating a Kalman gain;
an error signal calculating block for calculating an error signal by comparing an equalized signal, symbols, and the output signal of the Viterbi decoder with one another; and
a tap coefficient updating block for updating a tap coefficient of the filters by using the calculated error signal and the Kalman gain.

2. The Kalman-Viterbi joint channel equalizer according to claim 1, wherein the Kalman gain calculating block updates the tap coefficient by applying a fast Kalman algorithm in the blind mode.

3. The Kalman-Viterbi joint channel equalizer according to claim 2, wherein the Viterbi decoder uses a Viterbi decoding algorithm in the blind mode.

4. The Kalman-Viterbi joint channel equalizer according to any one of claims 1 to 3, wherein the Viterbi decoder reduces a tracing back length to use the reduced tracing back length in obtaining errors for tap coefficient updating.

5. The Kalman-Viterbi joint channel equalizer according to any one of claims 1 to 3, wherein the Viterbi decoder corrects errors by skipping symbols in a predetermined number of symbols to obtain errors for tap coefficient updating.

6. The Kalman-Viterbi joint channel equalizer according to any one of claims 1 to 3, wherein a symbol location of a robust stream is previously recognized and is applied to a data duration blind algorithm using the Viterbi decoder when an E-VSB is applied to the Kalman-Viterbi joint channel equalizer.

7. A VSB signal receiving system, comprising:
a tuner for receiving an RF signal from an antenna and synchronizing the RF signal with a local oscillation signal to transform the RF signal into an IF signal;
an NTSC removing filter for removing an NTSC component from the IF signal to prevent degradation of an HDTV due to the NTSC component;
an equalizer for removing multi-path distortion generated in a transmission channel by equalizing the input signal;
a phase tracer for removing phase noise from the equalized signal;
a trellis decoder for performing trellis decoding with respect to an output signal of the phase tracer and outputting a decoded signal;
a data de-interleaver for performing reverse interleaving to the decoded signal;
an RS decoder for performing Reed-Solomon decoding to the output signal of the data de-interleaver so as to generate error-corrected bit streams; and
a de-randomizer for providing the output signal of the RS decoder to other elements of the VSB signal receiving system,
wherein the equalizer further comprises:
a forward filter and a backward filter for receiving an input signal and a predetermined signal and performing filtering to the signals;
a Viterbi decoder for correcting errors during a transmission procedure in a blind mode;

a training symbol storing block for storing training symbols;

a switching block for classifying the output signal of the Viterbi decoder and symbols in accordance with a training mode and the blind mode and inputting the output signal of the Viterbi decoder and symbols into the backward filter;

a Kalman gain calculating block for receiving input signals of the forward filter and the backward filter and calculating a Kalman gain;

an error signal calculating block for calculating an error signal by comparing an equalized signal, symbols, and the output signal of the Viterbi decoder with one another; and a tap coefficient updating block for updating a tap coefficient of the filters by using the calculated error signal and the Kalman gain.

* * * * *